Patented Oct. 31, 1922.

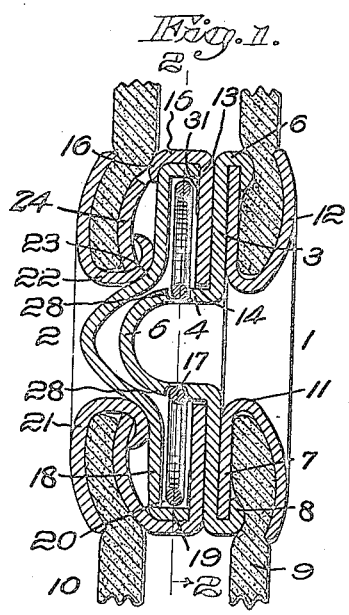
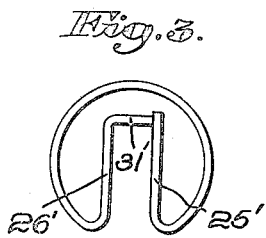
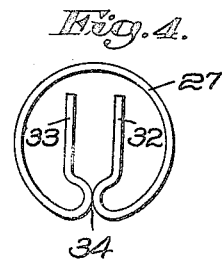
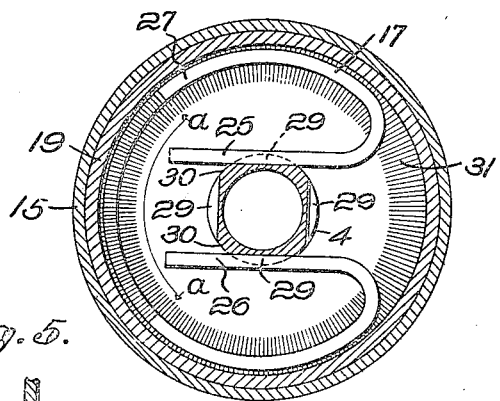
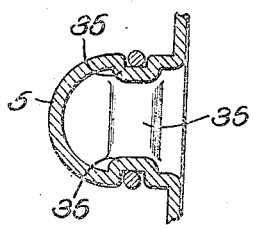

1,434,245

UNITED STATES PATENT OFFICE.

WILLIAM E. CHOATE, OF SAN FRANCISCO, CALIFORNIA.

FASTENER.

Application filed March 17, 1920, Serial No. 366,623. Renewed September 25, 1922. Serial No. 590,538.

*To all whom it may concern:*

Be it known that I, WILLIAM E. CHOATE, a citizen of the United States, and resident of San Francisco, county of San Francisco, and State of California, have invented an Improvement in Fasteners, of which the following description, in connection with the accompanying drawings, is a specification, like characters on the drawings representing like parts.

This invention relates to fasteners and more particularly lock fasteners such, for example, as are adapted for use on gloves or like articles, and the object thereof is to provide a fastener of the type comprising stud and socket members which members may readily be attached to their respective parts without regard to the positions thereof other than the registering of the stud with the aperture of said socket member.

The invention consists in the combination and arrangement of parts set forth in the following specification and particularly pointed out in the claims.

In the accompanying drawings I have shown merely for the purposes of illustration types of fasteners embodying this invention wherein:

Fig. 1 is a vertical section greatly enlarged through the two members constituting the fastener which members are shown attached together and to their respective parts;

Fig. 2 is a transverse section taken on the line 2—2 of Fig. 1;

Fig. 3 is a detail view of a modified form of spring;

Fig. 4 is a detail view of still another form of spring; and

Fig. 5 is a detail vertical section through a stud member illustrating the recesses or shoulders of said stud formed by indenting portions of the material constituting said stud as distinguished from cutting away by milling or otherwise, portions of the material.

In the drawings, 1 is a stud member and 2 a socket member, the stud member in the present example consisting of a base plate 3 preferably of circular formation having a hollow stud 4 struck up therefrom centrally of said plate. The end or nose of said stud is preferably of rounded formation as shown at 5 to facilitate the insertion thereof into the socket member. The base plate 3 may be equipped in various ways for attachment to one of the parts of the article and herein I have shown said plate 3 provided with a marginal flange 6 of sufficient depth to receive a second plate 7, and extending from said marginal flange are tongues or ears 8 adapted for clinching over the edge of said plate 7 and thus positively to secure said plates together. The second plate 7 as shown is provided with means for securing it to the article for which the fastener is equipped, herein the overlapping portions 9 and 10 of a glove, although clearly the fastener is not confined to its present adaptation. The plate 7 is further provided with a neck or tubular portion 11 which after insertion through an opening formed in said material 9 is suitably clinched over said material as shown at 12.

The socket member 2 is herein shown as embodying a base plate 13 having a central aperture 14 to receive the stud 4, said plate 13 also including a marginal or peripheral flange 15. The base plate 13 constitutes one wall of a holder or casing within which is arranged a suitable stud gripping element herein a spring member 17 and this spring is retained within said holder by a back plate 18 of any desired form but herein embodying a marginal flange 19 arranged to fit within the marginal flange 15 of said base plate 13 and is retained therein by tongues 16 which, following the assembling of said plates, are bent to engage the back of said plate 18 as shown in Fig. 1, said plates 13 and 18 forming between them a recess 20 of slightly greater depth than the thickness of said spring member 17 whereby a slight movement of said spring between said plates will be permitted for reasons hereinafter set forth. Obviously various means may be provided for securing said socket member to the part 10 of the glove. Such means however form no part of the present invention but for convenience and in order that the invention may be more clearly understood such means have been provided and consist of a clinching member 21 having a tubular or neck portion 22 for penetrating the material 10, and the extremity thereof during such penetration is adapted to be forced against a suitably formed anvil-like portion 23 on the back plate 18 thereby effecting the clinching of said tubular portion 22 over an inturned flange 24, the latter constituting an integral continuation of the marginal flange 15, that is rolled or otherwise produced following the insertion of said plate 18 therein.

In most fasteners of the type herein disclosed it is necessary that the two members thereof namely the socket and stud members be fastened to their respective parts in certain definite relation in order that said members may readily be separated when desired. The above is particularly necessary where there are notches in one of the fastener parts into which gripping members or arms of the other part must fit to effect the locking together of the fastener parts.

To obviate the necessity for such careful alignment of the parts of the fastener members in the present invention locking or gripping elements are provided respectively for said stud and socket members, one of which is rotatable or floatingly arranged with respect to the other whereby upon the insertion of the stud member within the socket member there will be a self-aligning or self-adjusting of the parts without attention or assistance from the person operating the same. In this embodiment the gripping element of the socket is the floating or rotatable one and comprises substantially parallelly disposed resilient members or arms 25 and 26, herein the terminal portions of the spring member 17, said spring member being herein formed from a single piece of wire having a body portion 27 of substantially semi-circular form and adapted normally to turn or float within the flanged portion 19 of the back plate 18, said flange 19 being likewise of circular formation as are both corresponding portions of the socket and stud members.

The resilient arms 25 and 26 of said spring are as previously stated substantially parallelly disposed and the distance between them is slightly less than the diameter of the aperture 14 in said base plate 13; or slightly less than the diameter of the stud 4 and these arms are arranged transversely of said aperture to extend equally over opposite portions thereof, thus being positioned to engage the stud when the same is inserted in said socket member.

As previously stated the stud member also has gripping elements and these in the present example consist of shoulders 28 formed by slotting or recessing the stud at diametrically opposed portions of its outer surface as shown at 29, preferably a plurality of sets of such opposed slots being provided which slots are arranged in spaced circumferential alignment to respectively receive and engage the gripping members 25 and 26 of said spring. By placing said slots relatively close together so that the remaining unslotted portions 30 of the stud between said slots will be too small to serve as a rest for the arms of said spring, said arms will, when brought into transverse alignment therewith, be forced into one or the other adjacent slots and thereby effect the self-adjustment or positioning of said spring provided there is no unnecessary friction upon the remaining portions of said spring. To guard against the latter possibility said spring holder, as hereinbefore stated, is made of slightly greater depth than the thickness of said spring and upon the insertion of said stud within the aperture and between the arms 25 and 26, said spring will first be forced against the back wall of the plate 18, but when said arms 25 and 26 nearly align with the circumferential series of grooves which herein are placed with relation to said stud so as to be substantially central of the chamber of said spring holder, at a time when the base plates of the stud and socket members are in contact, the gripping elements or spring arms 25 and 26 will snap into certain of said recesses and effect the centralizing of the spring within the holder thus removing all friction thereon and greatly facilitating the self-adjustment of said spring due to the seating of its arms against the bottoms of the recesses.

The shoulders 28 produced by the recesses 29 may be varied in depth so that the gripping power of said gripping elements will be increased or diminished according to the purpose for which the fastener is intended to be used. In any case, however, it is desirable that the recesses be sufficiently deep to prevent separation of the stud and socket members when a direct or axial pressure is applied to one or the other of said members tending to separate them. The bottoms of the slots or recesses 29 are in the present example made straight so as to conform with the sides of the resilient members 25 although obviously the invention is not limited to such a form but may be varied to conform with curved or otherwise shaped resilient members, or the bottoms of said slots need not necessarily conform to the spring arms that are to rest therein providing said shoulders are permitted to engage enough of the resilient arms to prevent them from being too readily separated.

To separate the stud and socket members a relative movement therebetween is created which relative movement owing to the polygonal cross-sectional area of the stud effects a separation of the arms 25 and 26 thereby removing said arms from the recesses and from beneath the shoulders 28 and placing them in contact with the unslotted portions 30 of said stud whereby said stud may then be removed without hindrance from between the spring arms. Under normal conditions, however, it will be obvious that no such relative movement between said spring and said stud will exist owing to the lack of contact between said spring and its holder and to provide such a relative movement separating or axial pressure is first applied to the two members to move said spring in contact with the inner face of the back plate 13 to produce the necessary friction whereupon a subsequent rotary movement of the stud will produce the relative movement necessary to cause a separation of the arms 25 and 26 and permit the withdrawal of the stud.

Obviously the degree of resistance necessary to prevent rotation of the spring with the stud during the separating action will vary with the strength or stiffness of the spring and it may sometimes be necessary to provide adidtional frictional or retarding means for said spring. Therefore, in the present example means have been provided for increasing the resistance or the friction between said spring and the plate 13 herein by the roughening by any suitable method, of the marginal portion 31 of said plate 13 and portions of the adjacent contacting edges of the semi-circular or body portion 27 of said spring.

It is desirable however that the resiliency or flexibility of said spring be retained in its highest possible degree, therefore only a portion of said spring is roughened preferably that portion indicated between the points a—a as shown in Fig. 2 which lies at the back of said spring thus leaving the extremities of said spring free for deflection by the stud 4. The shape and size of the spring may likewise be varied within the scope and purpose of the invention to correspond with the functions thereof. It is, however, desirable, although not essential, that all portions of said spring be contained in one plane and that both faces of said spring be alike so that in assembling the device no thought need be given to the manner in which said spring is placed within the chamber provided therefor.

It is also desirable that the arms 25 and 26 be arranged at a fixed or predetermined distance apart and remain in such positions except when separated by the introduction of the stud member or by the rotation of said stud incidental to the withdrawal thereof from the socket. This may be accomplished in several ways as for instance in the form shown in Fig. 2, the proper positioning of said arms is effected by "setting" the spring, an operation well known to those skilled in the art. Other methods however may be employed such for instance as that shown in Fig. 3 wherein the end 26' is bent toward and into engagement with the end of the arm 25' and thus positively position the two arms at the right distance apart. In Fig. 4 another method of properly spacing the resilient arms 32 and 33 is shown wherein the portions of the spring where said arms unite with the semicircular body 27 are so shaped as to contact one with the other at 34 and thus definitely position said arms at the proper distance apart.

In the example already described the recesses or slots 29 in the stud 4 which constitute the gripping elements are indicated as though they were cut or milled in the sides of said stud and this clearly is a practical and desirable manner of forming such slots. The invention, however, is not limited to this type of slot but within the scope and purpose thereof indentations may be formed corresponding to said slots by pressing the metal constituting said stud inwardly as shown at 35 in Fig. 5. To effect the inter-engagement and locking together of the stem and socket members of said fastener the rounded nose 5 of the stud is inserted in the aperture 14 of the socket and between the arms 25 and 26 of the spring until said arms are brought into alignment with the circumferential series of notches or recesses in said stem and when this position is reached the action of said spring tends to constrict said arms causing them to return to their normal positions and by so doing effect the rotation of said spring within its holder until the sides of said arms are properly positioned within their respective recesses or grooves; in other words producing a self-alignment or self-adjustment of the gripping elements of said fastener members. To withdraw or separate the members of said fastener pressure is applied to said members in substantially opposite directions and at the same time a rotary action may be applied to one or the other of said members or to both of said members in opposite directions. This double action causes the spring members 17 to engage the inner wall of the plate 13 and the friction produced by such engagement will be sufficient to restrict or entirely prevent rotation of said spring while continued movement of the stud with respect to said spring causes the portions 30, separating successive recesses to be brought into engagement with the inner edges of said arms 25 and 26 and because the diameter of said stud through said portions 30 is greater than the diameter thereof through the recess 29 where said springs normally rest, said springs will be separated a distance coinciding with the diameter of the stud 4 and thereby remove all resistance, other than the pressure of the springs 25 and 26 against said stud, tending to prevent separation of said fastener members.

From the foregoing description it will be obvious that a locking fastener is provided wherein the two members thereof may be placed upon their respective sections without regard to registration or alignment other than axial alignment of said members; hence no special or expensive construction of the holders will be required to insure the proper assembling and functioning of the fastener members.

While I have herein shown and described certain specific embodiments of my invention, and have disclosed and discussed in detail the construction and arrangement incidental to such disclosure, it is distinctly to be understood that the invention is limited neither to the mere details or relative arrangement of the parts nor to the specific applications herein shown, but that extensive variations may be made without departing from the principles thereof.

Claims:

1. A fastener comprising interengageable stud and socket members and gripping elements for said members adapted for automatic relative rotatable movements to effect the interlocking of said elements during the pressing together of said members.

2. A fastener comprising interengageable stud and socket members and gripping elements for said members adapted for automatic relative revoluble self-adjustment during the pressing together of said members.

3. A fastener comprising a stud having a circumferentially spaced series of recesses, and a socket member including a revoluble spring member adapted upon the insertion of said stud within said socket member automatically to occupy one of said recesses.

4. A fastener comprising a stud having a circumferentially spaced series of recesses, and a socket member including a floating gripping element having opposed resiliently disposed members adapted, upon insertion of said stud, automatically to adjust themselves for interlocking engagement with said recesses.

5. A fastener comprising a stud having a circumferentially spaced series of recesses, a socket member including a floating gripping element having opposed resiliently disposed members adapted, upon insertion of said stud, automatically to adjust themselves for interlocking engagement with said recesses and means rendered effective by a separating action on said members, for producing relative movement between said gripping elements, whereby said elements are disengaged.

6. A fastener comprising interengageable stud and socket members respectively provided with gripping elements, one of said elements being floatingly disposed to allow the relative rotatable self-positioning of said elements to their gripping positions upon the insertion of said stud member within said socket member.

7. A fastener comprising interengageable stud and socket members respectively provided with gripping elements, one of said elements being disposed for self-alignment thereof with the other gripping element upon the insertion of said stud within said socket, and means to prevent movement of said floating element during the separation of said elements whereby a disengaging action is produced.

8. A fastener comprising a stud member having opposed shoulders, a socket member having resilient means for engaging said shoulders, one of said members being rotatably mounted with respect to the other, and frictional means to retard movements of said rotatable member during a combined rotary and axial separating movement of said members.

9. A fastener comprising interengageable stud and socket members each having a gripping element located at a point in its circumference, one of said elements being rotatably mounted with respect to the other to effect an automatic circumferential aligning and interlocking of said elements upon the insertion of said stud within said socket.

10. A fastener comprising a socket member including a holder having a stud receiving aperture, a spring arranged to float within said holder with a resilient arm disposed transversely of said aperture, and a stud adapted for insertion in said aperture, said stud having a series of spaced shoulders in its periphery severally adapted to receive and automatically position said resilient arm in yielding interlocking engagement with said stud.

11. A fastener comprising a socket member including a holder having a stud receiving aperture, a spring rotatably arranged within said holder with a pair of resilient arms disposed transversely of said aperture, a stud adapted for insertion in said aperture between said resilient arms, and a plurality of sets of opposed peripheral shoulders on said stud adapted to effect the self-adjustment of said resilient arms to interlocking engagement with said stud.

12. A fastener comprising interengageable stud and socket members, said stud member having a series of closely spaced opposed recesses, a floating spring for said socket member having a pair of resilient arms to respectively engage opposed shoulders of said stud and to cooperate with said shoulders in effecting an automatic interlocking engagement of said resilient arms with said stud during the insertion of said stud in said socket.

13. A fastener comprising an apertured plate, a spring arranged in floating relation to said plate, said spring having a pair of resilient arms disposed in juxtaposition to said aperture, a stud having opposed shoulders adapted upon the insertion of said stud within said aperture automatically to effect interlocking alignment of said arms with said shoulders and to yieldingly maintain said stud and socket members together, and friction means to cooperate with said shoulders to effect the unlocking of said resilient arms from said stud.

14. A fastener comprising a socket having a revoluble gripping member, and a stud having a shouldered polygonal transverse area adapted to engage and effect the interlocking of said gripping member with the sides of said polygonal area upon the insertion of said stud within said socket.

15. A fastener comprising interengageable stud and socket members respectively including gripping elements constituting self-locking means effective upon the insertion of said stud within said socket, one of said gripping elements being mounted to rotate with respect to the other during the insertion of said stud member, and means rendered effective upon attempted withdrawal of said stud member from said socket member to prevent rotation of said rotatable element whereby said gripping elements will be unlocked for separation.

16. A fastener comprising an apertured socket member and a stud member adapted for insertion within said aperture, a floating spring member provided with a pair of resilient arms disposed in juxtaposition to said aperture and means to position said arms in predetermined spaced relation, said means including a portion of one of said arms bent laterally to provide engagement between its extremity and the other arm.

17. A fastener comprising an apertured socket member and a stud member adapted for insertion within said aperture, a floating spring member provided with a pair of resilient arms disposed in juxtaposition to said aperture, and means to position said arms in parallel predetermined spaced relation for the reception of said stud member, said means including an offset portion at the extremity of one of said arms extending toward and having its extremity normally engaging the other arm.

18. A fastener comprising a circularly formed socket member provided with an apertured base plate, a spring rotatably arranged within said socket member in juxtaposition to said plate, said spring including a circularly formed portion having resilient portions disposed across the aperture of said plate, said spring and said plate having cooperating frictional areas, a stud adapted for insertion in said aperture and provided with a series of closely spaced opposed recesses formed in circumferential alignment in the outer periphery of said stud and adapted upon the insertion of said stud to receive the resilient portions of said spring and to effect automatic interlocking engagement thereof with said recesses whereby said stud and socket members will be locked one to the other.

19. A fastener comprising a socket member including the floating spring element 17, and a relatively stationary stud 4 to engage said spring element, said stud having alternate recessed portions 29 and unrecessed portions 30 for respectively effecting the automatic locking together, and the unlocking of said stud and spring elements.

20. A lock fastener comprising stud and socket members and locking elements for said members the locking element for said socket member being constructed and arranged automatically to rotate to interlocking relation upon insertion of said stud member within said socket.

21. A lock fastener comprising stud and socket members and locking elements for said members, one of said elements being constructed and arranged automatically to rotate to interlocking relation upon insertion of said stud member within said socket.

22. A lock fastener comprising interlocking elements, one of said elements being rotatably arranged automatically to assume its locking position with respect to the other element.

23. A lock fastener comprising interengaging members and relatively rotatable locking elements for said members constructed and arranged to rotate to their relative locking positions upon the engagement of said members.

24. A lock fastener comprising interlocking elements arranged automatically to assume their respective locking positions when moved into locking engagement, and means operative during a rotary separating action of said elements to effect a relative unlocking movement of said elements whereby said elements may be separated.

25. In a fastener, a socket member provided with substantially parallel opposed resilient gripping elements automatically rotatable therein.

26. A lock fastener comprising a stud member having a circumferential series of closely spaced transverse recesses, a socket member and a gripping element floatingly arranged within said socket member automatically to register with said transverse recesses upon insertion of said stud within said socket member.

In testimony whereof, I have signed my name to this specification.

WILLIAM E. CHOATE.